POULTRY PROCESSING EQUIPMENT
Filed April 16, 1959 2 Sheets-Sheet 1
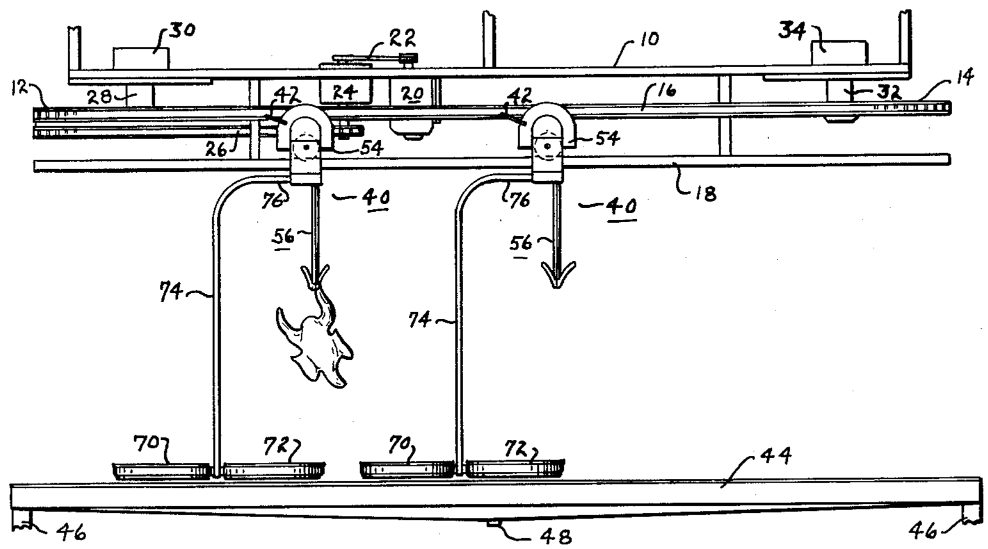
FIG. 1
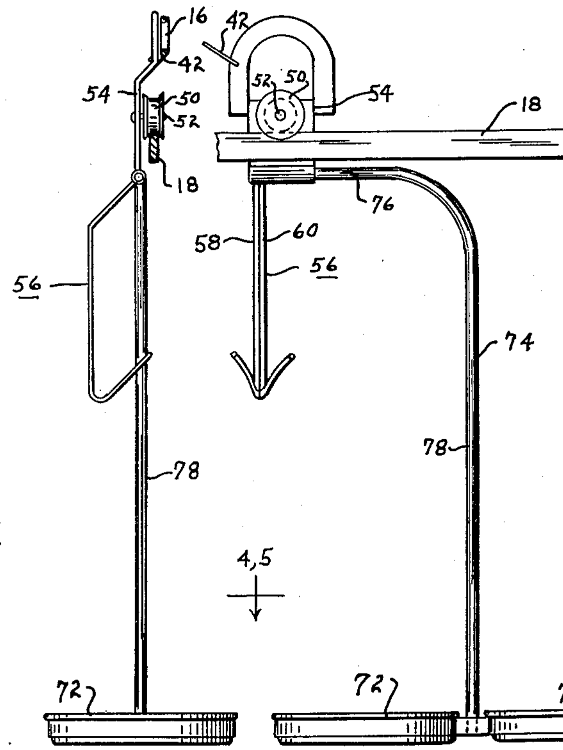
FIG. 2
FIG. 3
INVENTOR.
DWIGHT A. ROTH
BY M. A. Hobbs
ATTORNEY Nov. 21, 1961 D. A. ROTH 3,009,194
POULTRY PROCESSING EQUIPMENT
Filed April 16, 1959 2 Sheets-Sheet 2
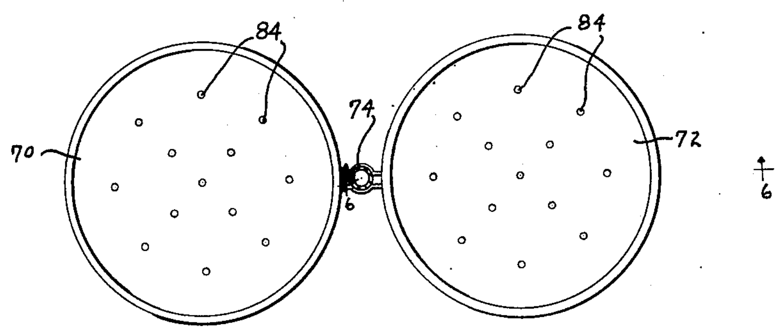
FIG. 4
FIG. 5
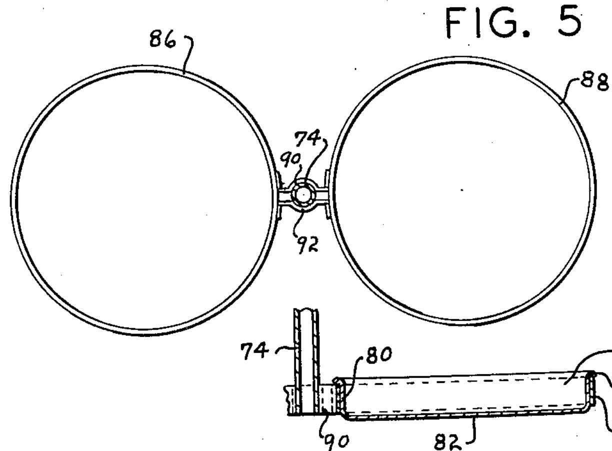
FIG. 6
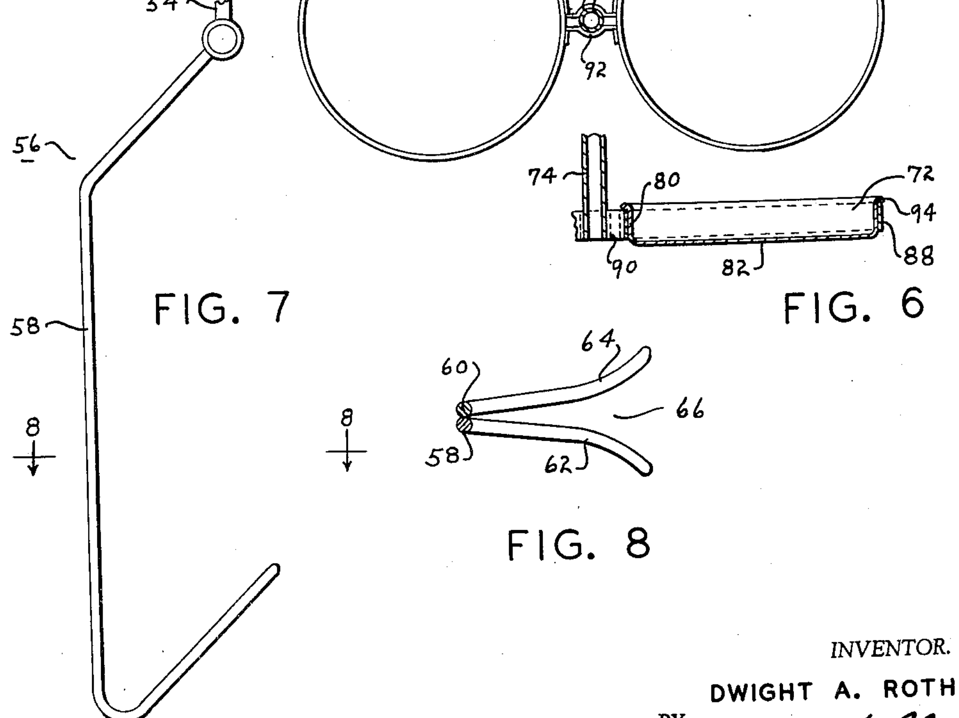
FIG. 7
FIG. 8
INVENTOR.
DWIGHT A. ROTH
BY M. A. Hobbs
ATTORNEY 3,009,194
POULTRY PROCESSING EQUIPMENT
Dwight A. Roth, % Land-O-Goshen Poultry Co., New Paris, Ind.
Filed Apr. 16, 1959, Ser. No. 806,949
2 Claims. (Cl. 17—11)

The present invention relates to poultry processing equipment and more particularly to an apparatus for use in preparing poultry for packaging, shipping and marketing.

One of the principal objects of the present invention is to provide an apparatus to facilitate cutting poultry into pieces and sorting the pieces into various lots containing the parts to be packaged and sold together.

Another object of the invention is to provide an apparatus for use in assembly line operations for holding the poultry firmly in a convenient position while it is being cut into pieces and for carrying the pieces in various desired lots to a station for packaging.

Still another object of the invention is to provide a relatively simple, easy to use device for assisting in cutting poultry, and draining excess fluid from the parts while they are being transferred from the station where the cutting operation is performed to the station where the parts are packaged.

A further object is to provide a device for use in cutting poultry into parts and sorting the parts into desired combinations thereof, which can easily be kept in a sanitary condition while the device is being used in a continuous operation.

Another object of the invention is to provide an apparatus for performing the aforementioned operations which lends itself both to a rapid one-man operation and to multiple-man operations without changing or altering the apparatus or station where the cutting operations are performed, in shifting from the single to multiple-man operation.

Additional objects and advantages will become apparent from the following description and accompanying drawings, wherein:

FIGURE 1 is an elevational view of the present apparatus showing two of the devices used in the cutting operation, one of the devices containing a dressed chicken ready to be cut into its various parts;

FIGURE 2 is an enlarged elevational end view of one of the devices shown in FIGURE 1, for holding poultry while the cutting operation is being performed;

FIGURE 3 is a front elevational view of the poultry holding device shown in FIGURES 1 and 2;

FIGURE 4 is a partial sectional and top plan view of the poultry holding device of the preceding figures, taken on line 4—4 of FIGURE 3;

FIGURE 5 is a partial sectional and top plan view of the device shown in FIGURE 4 with the means for holding the severed parts removed therefrom;

FIGURE 6 is a vertical cross sectional view of one of the holders of the severed parts, taken on line 6—6 of FIGURE 4;

FIGURE 7 is an enlarged side elevational view of the fixture employed to hold the poultry during the cutting operation; and FIGURE 8 is a horizontal cross sectional view of the fixture shown in FIGURE 7, taken on line 8—8 of the latter figure.

Referring more specifically to the drawings and to FIGURE 1 in particular, numeral 10 designates a frame suspended from the ceiling or overhead beams and supporting a pair of spaced gears 12 and 14, an endless chain 16 disposed on and driven by said gears, and a track 18 running parallel with the chain and spaced slightly outwardly therefrom. The chain shown is an open link type and is driven by an electric motor 20 through a belt 22, speed reduction mechanism 24 and a drive chain 26 extending from mechanism 24 around gear 12 below chain 16, the motor and gear reduction mechanism being conventional or standard equipment and supported on frame 10 by any suitable brackets or members (not shown). Gear 12 is rotatably supported on frame 10 by a shaft 28 journaled in a bearing mounting 30 rigidly supported on the frame, and gear 14 is rotatably supported by a shaft 32 journaled in a bearing mounting 34 also rigidly supported on the frame. The over-all horizontal configuration of chain 16 on track 18 would normally be oval, varying substantially in length depending on the requirements of any particular installation, although other layout configurations can be used to suit requirements.

Mounted on track 18 is a plurality of movable poultry holding devices 40 preferably equally spaced from one another and disposed along the track throughout its length. Each device is connected to chain 16 by a coupling 42 and is pulled or driven along the track by the chain as the latter is driven by motor 20 through pulley 22, gear reduction mechanism 24, chain 26 and gear 12. The speed at which the poultry holding devices are driven along the track may be varied to suit requirements; however, they are normally driven at such a rate that one man can perform a complete cutting operation without moving from his station along the track. A tray 44 or trough is provided to catch any water, blood or other fluid dripping from the bird while it is being cut into pieces and from the parts while they are being moved from the cutting station to the packaging station. The tray is supported by legs 46 and is provided with a drain outlet pipe 48. After the birds are cut into the desired parts the holding device carries the parts from the cutting station at one point or location along the track to a packaging station at another point or location along the track. The apparatus may be completely contained in a single room with both the cutting and packaging being performed within a relatively small area, or the cutting station and packaging station may be separated a substantial distance, possibly in separate rooms of a processing plant.

The poultry holding device 40 is supported on track 18 by a roller 50 journaled on a shaft 52 which is rigidly connected at the outside end to a support member 54 of the holding device. Coupling 42, which is preferably flexible, is connected at one end to member 54 and at the other end to chain 16. Rigidly secured to the lower part of member 54 is a poultry holding fixture 56 consisting of two metal rods 58 and 60 welded to the lower edge of member 54 and having a generally vertical portion joined firmly to one another by welding or clamping. From the lower end of the vertical portion extending upwardly and inwardly toward the center of the apparatus are prongs 62 and 64 of rods 58 and 60, respectively, which extend laterally away from each other progressively throughout their length from the vertical portion to the free ends thereof. These prongs form a slot 66 therebetween for receiving a bird appendage such as a leg or neck for supporting the bird on the fixture, as illustrated in FIGURE 1, the prongs preferably curving distinctly away from each other near the free ends thereof to facilitate insertion of the bird leg or other part between the prongs. It will be observed from FIGURES 2 and 7 that the position which the bird assumes when it is placed between the prongs is such that the center of gravity is approximately directly below member 54 so that roller 50 and member 54 will maintain their vertical positions above track 18. The slot formed by the prongs is approximately shoulder high for an average man from the floor, thus permitting the cutting operation to be performed within easy reach of the operator.

Containers are carried along with the holding device and in the device shown include two trays 70 and 72 supported at the lower end of a rod 74, said rod having a horizontally extending section 76 to space the vertical section 78 laterally sufficiently to permit free manipulation of the bird held between the prongs during the cutting operation. The two trays 70 and 72 are round and have low side walls 80 and a disc-shaped body 82 containing a plurality of holes 84 to permit the fluid draining from the parts of the bird placed in the trays to drain from the trays onto tray 44. Trays 70 and 72 are removably supported on rod 74 by hoops 86 and 88 rigidly joined to the lower end of the rod in horizontal position either directly or by cross members 90 and 92 which are attached at their centers to the lower end of the rod and at their ends to the hoops. The trays are supported in the hoops by the flange 94 around the upper edge of the trays and are held loosely in the hoops so that they can be easily removed for cleaning.

In the operation of the present poultry processing apparatus, motor 20 is placed in operation to drive chain 16 around gears 12 and 14 and thereby pull holding devices 40 continuously along oval track 18 between the poultry cutting station and the parts packaging station. A bird is hung on fixture 56 of each holding device as it travels from the packaging station to the cutting station and the operator at the cutting station cuts the bird into various marketable parts and places the parts in one or the other pan, thus sorting the parts which are to be packaged together as the cutting operation proceeds. The cutting operation is fully performed as the holding device moves at a constant speed along the track and will usually be completed while the bird is almost directly in front of the operator and with the operator standing or sitting in one place. The parts are carried in trays 70 and 72 along the track to the packaging station where they are removed for packaging and the trays proceed along the track to return to the cutting station in a continuous operation.

While only one embodiment of the invention is illustrated herein, various changes and modifications may be made without departing from the scope thereof.

I claim:

1. A poultry processing apparatus, comprising an overhead frame, a continuous track supported by said frame, a plurality of equally spaced poultry holding devices on said track, a plurality of gears supported on said frame and disposed adjacent to said track, an endless chain on said gears, a motor for driving one of said gears, each of said devices including a roller supported on said track, a support member, a shaft on said member for said roller, a coupling means connecting said member with said chain, a fixture extending downwardly from said member and having an upwardly and laterally extending pair of prongs forming a slot with an open end for holding poultry, a rod extending downwardly from said support member and spaced laterally from said fixture, two trays on opposite sides of said rod with a plurality of holes in the bottom thereof, hoops attached to said rod for removably supporting said trays, and a tray beneath said trays throughout at least a portion of the distance traveled by said devices.

2. A poultry processing apparatus, comprising an overhead frame, a continuous track supported by said frame, a plurality of poultry holding devices on said track, a plurality of gears supported on said frame and disposed adjacent to said track, an endless chain on said gears, a motor for driving one of said gears, each of said devices including a roller supported on said track, a support member, a shaft on said member for said roller, a coupling means connecting said member with said chain, a fixture extending downwardly from said member and having an upwardly and laterally extending pair of prongs forming a slot with an open end for holding poultry, a rod extending downwardly from said support member and spaced laterally from said fixture, a plurality of round shallow trays having a plurality of holes, and hoops attached to said rod for removably supporting said trays.

References Cited in the file of this patent

UNITED STATES PATENTS

| | | |
|---|---|---|
| 2,634,851 | Steinhoff | Apr. 14, 1953 |
| 2,738,547 | Zebarth | Mar. 20, 1956 |
| 2,817,874 | Conaway | Dec. 31, 1957 |
| 2,839,781 | Jarvis | June 24, 1958 |
| 2,874,404 | Gonzalez | Feb. 24, 1959 |
| 2,902,138 | Oelkers | Sept. 1, 1959 |